United States Patent [19]

Dobson

[11] Patent Number: 4,751,951
[45] Date of Patent: Jun. 21, 1988

[54] SAFETY SUPPORT SYSTEM FOR A TUBELESS TIRE

[75] Inventor: Robert L. Dobson, Tallmadge, Ohio

[73] Assignee: The Goodyear Tire & Rubber Company, Akron, Ohio

[21] Appl. No.: 531,855

[22] Filed: Sep. 14, 1983

[51] Int. Cl.$^4$ ............................................. B60C 17/04
[52] U.S. Cl. ..................................... 152/520; 152/158
[58] Field of Search ............... 152/152, 155, 157, 158, 152/330 RF, 310–314, 349, 350, 516, 520

[56] References Cited

U.S. PATENT DOCUMENTS

| | | | |
|---|---|---|---|
| 3,195,601 | 7/1965 | Travers | 152/313 |
| 3,509,928 | 5/1970 | Aghnides | 152/158 |
| 3,574,317 | 4/1971 | Brewer | 152/313 |
| 3,814,158 | 6/1974 | Ryder | 152/158 |
| 3,935,892 | 2/1976 | Arimura et al. | 152/330 RF |
| 4,008,743 | 2/1977 | Welch | 152/311 |
| 4,183,388 | 1/1980 | Cassidy | 152/158 |
| 4,295,509 | 10/1981 | Stein | 152/330 RF |
| 4,334,565 | 6/1982 | Stokes | 152/313 |
| 4,418,734 | 12/1983 | Dobson | 152/158 |

FOREIGN PATENT DOCUMENTS

| | | | |
|---|---|---|---|
| 2902836 | 7/1979 | Fed. Rep. of Germany | 152/330 RF |
| 1390440 | 1/1965 | France | 152/157 |

Primary Examiner—Michael Ball
Attorney, Agent, or Firm—Frederick K. Lacher; Henry C. Young, Jr.

[57] ABSTRACT

A safety support system in which an annular safety support of resilient material having an outer diameter less than the inner diameter of the tire is positioned around a rim and within the tire. The resilient material of the safety support is under pressure and reinforcing cords are wrapped around the annular safety support to control expansion and maintain the safety support in position between the bead portions in the deflated condition of the tire. The resilient material may be of foam having closed cells containing gas under pressure or it may be a generally solid material which is compressed upon installation or formed under pressure in the tire. The safety support may also have safety support flanges at the edges for positioning between folded portions of the tire sidewalls during operation of the tire in the deflated condition. The sidewall supporting flanges are reinforced by generally radial cords extending around the sidewall supporting flanges for stiffening and resisting bending of the flanges during operation of the tire in the inflated and deflated condition.

11 Claims, 5 Drawing Sheets

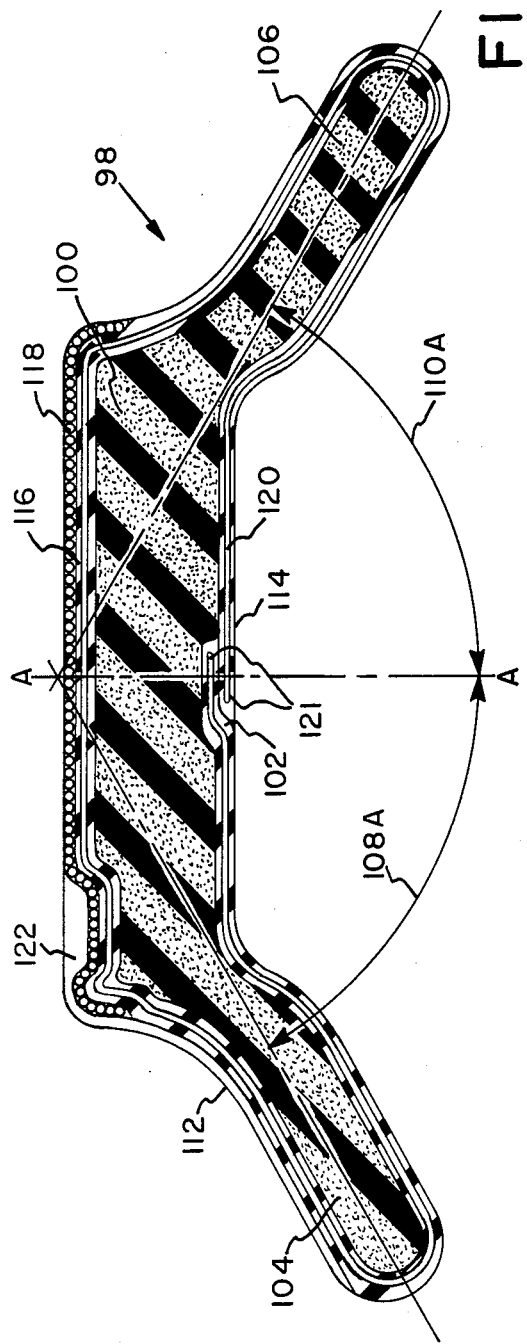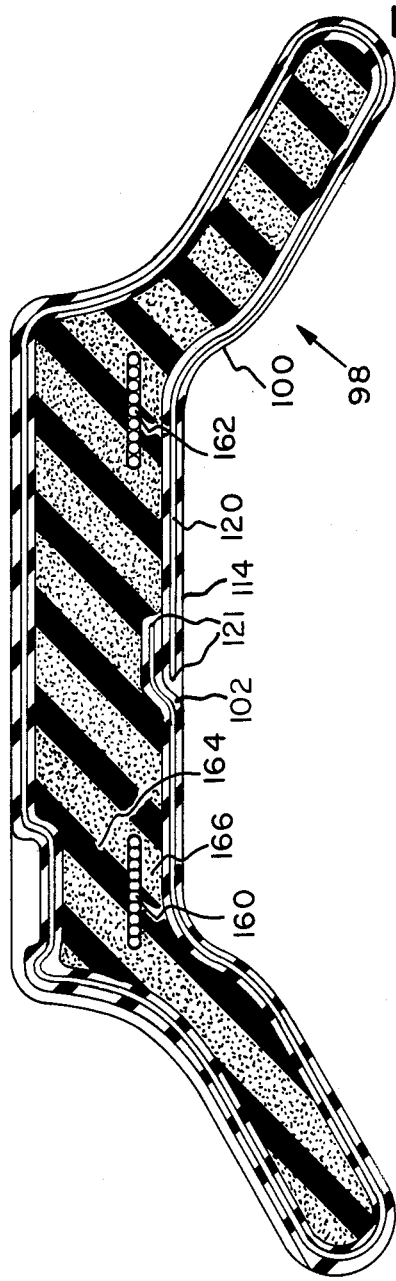

SAFETY SUPPORT SYSTEM FOR A TUBELESS TIRE

This invention relates generally, as indicated, to a system in which a safety support is positioned within a wheel rim inside a tire chamber to provide support and cushioning with the tire in a deflated condition. The invention is especially applicable to military vehicles where the tires may be deflated by bullets shot through the walls of the tires.

Safety support and rim assemblies such as the system set forth in my copending patent application Ser. No. 359,772, filed Mar. 19, 1982 have been made for supporting tires in the deflated condition. It has been found, however, that in certain applications there is a need for a safety support which does not require reinforcing bead rings but at the same time will prevent radial movement of the safety support out of the space between the bead portions of the tire to prevent axial movement of the bead portions during cornering of the tire. There has also been a need for a safety support with sidewall supporting flanges which maintain a stable position alongside the tire sidewalls during operation of the tire in the inflated condition and provide support to the tire sidewalls during operation in the deflated condition.

In accordance with one aspect of the invention there is provided a safety support system for a tire and rim assembly in which the tire is a tubeless tire having a tread, sidewalls and bead portions mounted on bead seats of a rim comprising a safety support with an annular safety support body of resilient material for positioning within the tire, the safety support body being confined in a casing having an outer wall with a predetermined radially outer diameter less than the radially inner diameter of the tire, an inner wall for mounting on the rim, having a radially inner diameter substantially the same as the diameter of the rim, the resilient material being under pressure between the bead portions in the casing, and the casing including reinforcing cords wrapped around the annular safety support body to control expansion and maintain the safety support body in position between the bead portions.

In accordance with a further aspect of the invention there is provided a safety support for mounting on a rim between bead portions of a tubeless tire comprising an annular body of resilient material having a generally cylindrical bead separating portion and sidewall supporting flanges at the edges extending axially and radially outward for positioning between the folded portions of the tire sidewalls during operation in the deflated condition, and reinforcing cords extending in a generally radial direction around the body at the surface thereof providing a stiffening reinforcement for the supporting flanges.

Other aspects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In the drawings:

FIG. 4 is a sectional view of a modified safety support body as molded and reinforced with a ply of radial cords and a belt of generally circumferential cords.

Figure 1:
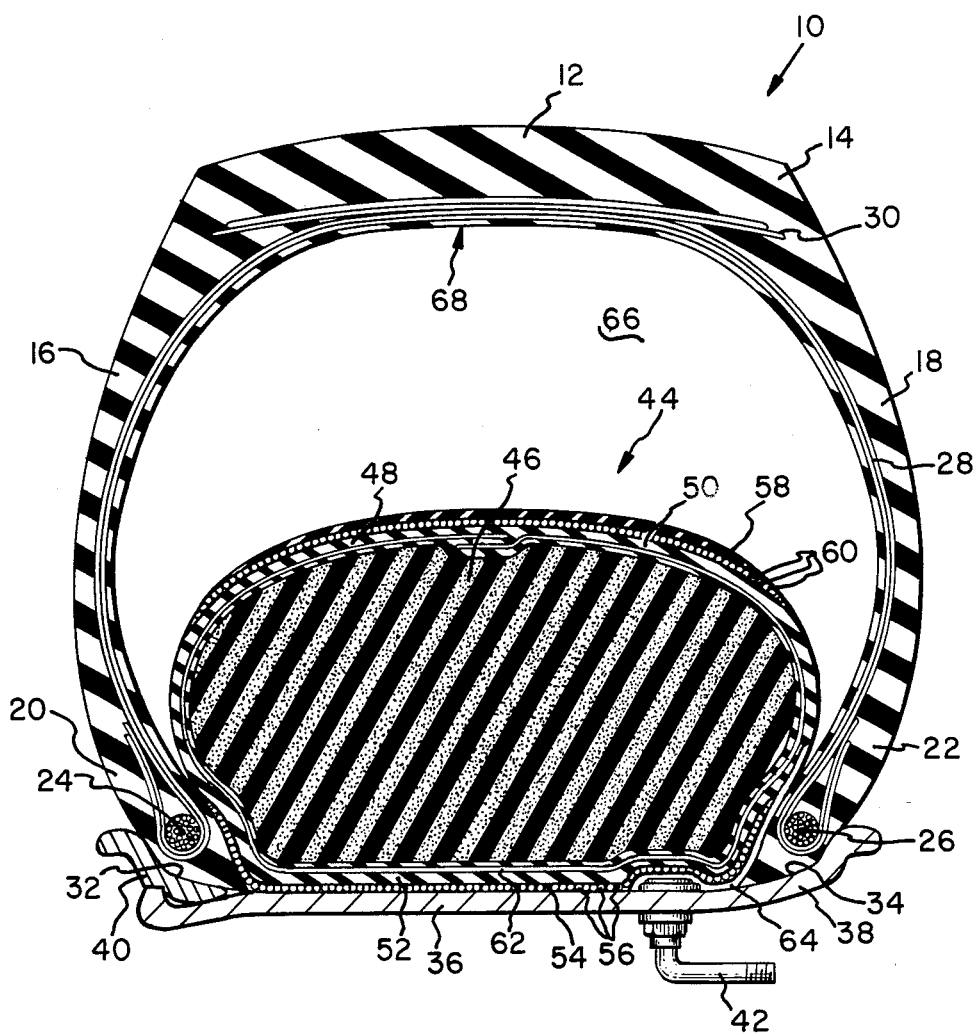
FIG. 1 is a cross-sectional view of one-half a tire and rim assembly embodying the invention taken along a radial plane containing the axis of the tire rim and safety support.
Figure 5:
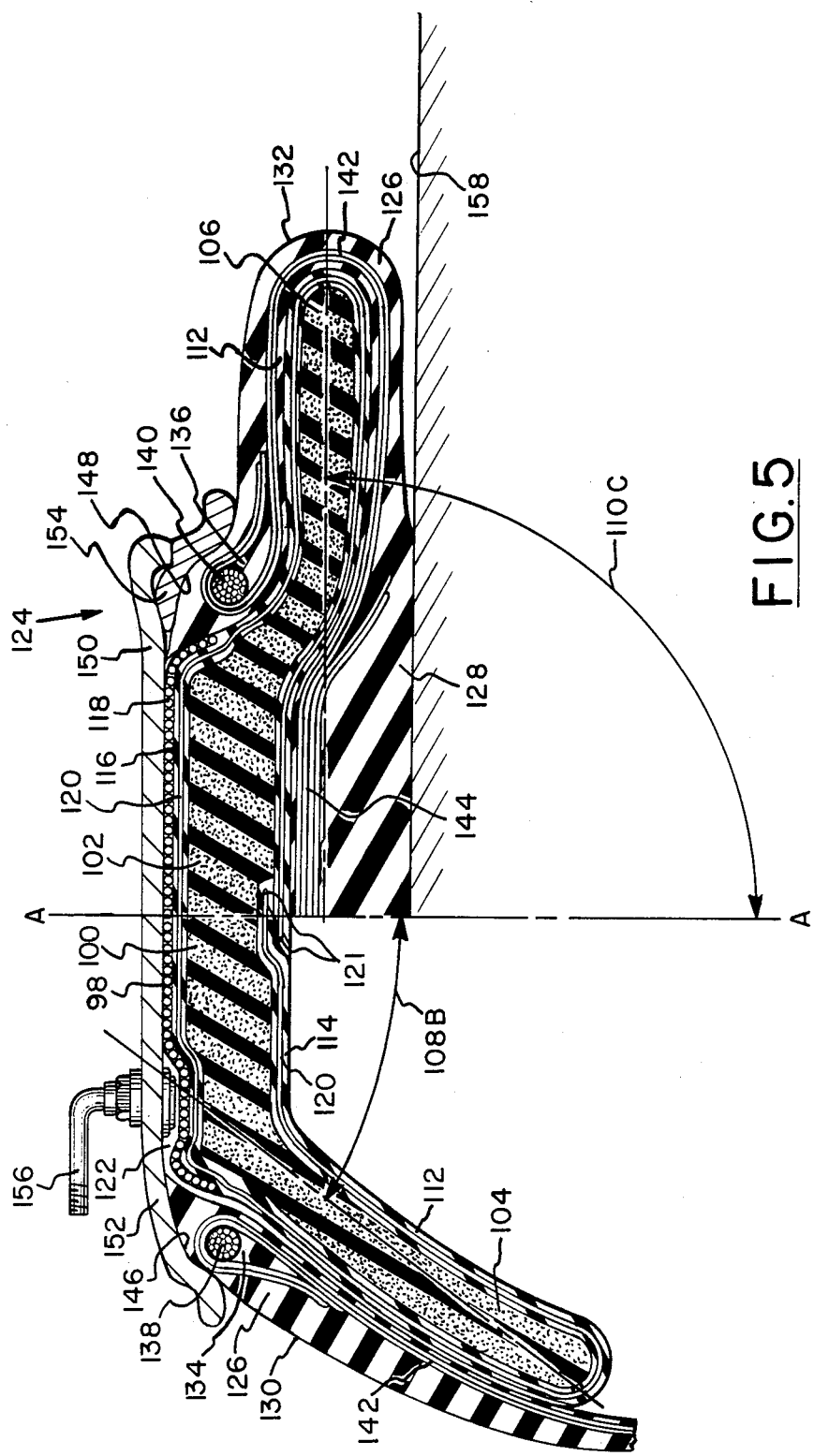

FIG. 5 is a sectional view like FIG. 1 showing the safety support of FIG. 4 mounted on a two-piece rim inside a tubeless tire. On the left side the sidewall supporting flanges are shown deflected against the tire sidewalls of an inflated tire for maintaining the flanges in a stable position. On the right side the portion of the tire and safety support adjacent the road is shown with the tire in the deflated condition.

FIG. 6 is a sectional view like FIG. 4 of a modified form of safety support.

Referring to FIG. 1, a safety support system 10 for a tire and rim assembly is shown in which a tubeless tire 12 has a tread 14, sidewalls 16 and 18, and bead portions 20 and 22 containing bead rings 24 and 26 connected by reinforcing fabric plies 28 having a reinforcing belt 30. The bead portions 20 and 22 of the tire 12 are seated on bead seats 32 and 34 of a rim 36 which may be of a cylindrical two-piece construction having bead seat 34 on one edge of a cylindrical rim member 38 and bead seat 32 on a split ring rim member 40. A tire valve 42 is mounted on the rim 36 for inflating the tire 12.

The safety support system 10 of this invention includes a safety support 44 having an annular safety support body 46 of resilient foam material containing closed cells of gas under pressure. The safety support body 46 is confined by a casing 48 having an outer wall 50 with a predetermined outer diameter less than the radially inner diameter of the tire 12. The casing 48 has an inner wall 52 for mounting on the rim 36 with the radially inner diameter of the inner wall being substantially the same as the diameter of the rim. The inner wall includes at least one reinforcing belt member 54 having circumferentially extending cords 56 for holding the safety support 44 on the rim 36.

An outer belt member 58 may be provided in the outer wall 50 and have circumferentially extending cords 60 for limiting the expansion of the outer wall during operation of the safety support system. The casing 48 also includes a ply of reinforcing cords 62 wrapped around the annular safety support body 46 in a generally radial direction to control expansion and maintain the safety support body in position between the bead portions 20 and 22 while the resilient material of the safety support body is under pressure.

A groove 64 may be provided in a hard rubber portion of the casing 48 adjacent the valve 42 and lead to tire inflation cavity 66 for communication between the cavity and valve to inflate the tire 12. The tire inflation cavity 66 is defined by the outer wall 50 of the safety support 44 and inner surface 68 of the tire 12. Preferably the section height of the safety support 44 is about sixty percent the section height of the tire 12.

The safety support system 10, shown in FIG. 1, is field mountable. The two-piece rim 36 has the split ring rim member 40 which can be mounted on the cylindrical rim member 38 and removed in a manner well known to those skilled in the art. The safety support 44 is preferably manufactured separately from the tire 12 and rim 36. For example, the belt member 54 may be wrapped around a collapsible building drum of a type well known in the tire building art. The ply of radial reinforcing cords 62 may then be placed over the belt member 54 and the preformed strips of rubber containing a heat-activatable blowing agent placed over the ply of radial cords 62. The edges of the ply of radial reinforcing cords 62 are then folded over the strips of rubber and overlapped. The outer belt member 58 may then be applied and covered with a predetermined quantity of rubber which may be the material of the casing 48. The assembled safety support 44 may then be placed in a mold and molded to a shape such as that shown in FIG. 1 with the foaming of the safety support body 46 and the vulcanization of the material of the casing 48.

The predetermined amount of rubber containing a heat-activatable blowing agent may be in the form of a number of layered preformed strips positioned within the mold (not shown).

The closed cell structure of the safety support body 46 is formed by heat activating the blowing agent during a vulcanization process to simultaneously expand the solid material placed within the casing 48 after the initial activation of the body. Typical vulcanization temperatures range from about 90° C. to 200° C. The cell structure of the safety support body 46 is required to be resilient in order to support the vehicle when the tire 12 is in the deflated condition and also exert an axial force against the bead portions 20 and 22 of the tire to resist relative axial movement of the bead portions and relative circumferential movement of the tire and rim 36. The resiliency can be characterized by having a compressibility in the range of about one to about 800 psi (0.07 to 56.25 kg/cm$^2$) and preferably about one to about 100 psi (0.07 to 7.03 kg/cm$^2$) at fifty percent compression at 25° C.

The cell structure typically has an unloaded specific gravity equal to about 0.60 to about 1.40, preferably about 0.80 to about 1.16. The term "unloaded specific gravity" relates to the structural material such as rubber without being loaded with pigments and fillers such as carbon black, silica, zinc oxide and oils. The amount of internal cell pressure desired is dependent upon the equivalent psi desired in the safety support 44. The tire 12 shown in FIG. 1 is preferably inflatable to a pressure of from about 50 to 80 psi (3.52 to 5.62 kg/cm$^2$) and the equivalent pressure in the safety support 44 is from about 60 to 115 psie (4.22 to 8.09 kg/cm$^2$e).

The term air pressure equivalent (psie) or equivalent psi as used in this description refers to the pressure of air in an encasement such as an inflatable tire which has a load deflection curve corresponding to the load deflection curve of the safety support 44. Accordingly, the equivalent psi (psie) of the safety support 44 at a certain load deflection is the same as the air pressure (psi) of a corresponding encasement at the same load deflection.

After foaming of the safety support body 46 the force of the body pressure against the bead portion portions 20 and 22 of the tire 12 is preferably greater than the air pressure in the inflation cavity 66 by at least 15 psi (1.06 kg/cm$^2$).

The closed cell safety support body 46 can be of various cured or vulcanized rubbers such as natural rubber and synthetic rubber and their mixtures or blends. For example, they can be rubbery butadiene-styrene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene terpolymers and polyurethane elastomers. Typically the various polymers are cured or vulcanized by normal curing methods and recipes such as with sulfur, or with peroxides in the case of the ethylene-propylene copolymers, or with primary diamines in the case of polyurethane elastomers. The sulfur cured or vulcanized natural rubber and synthetic rubbery polymers are preferred such as natural rubber and cis-1,4-polyisoprene.

The blowing agents used in the practice of this invention for the manufacture of the safety support 46 are those which liberate gases upon heating. Representative examples of such agents are those which liberate gases such as nitrogen, carbon dioxide, ammonium bicarbonate and sodium bicarbonate and cause the formation of the integral closed cell internal layer. Usually agents which liberate nitrogen are preferred. Such blowing agents are compounds which give off gases upon being triggered by the vulcanization temperatures, representative of which are nitro, sulfonyl and azo compounds such as dinitrosopentamethylene tetramine, N,N'-dimethyl-N,N'-dinitrosophthalamide, azodicarbonamide, sulfonyl hydrazides such as benzenesulfonyl hydrazide, toluenesulfonyl hydrazide and p,p'-oxy-bis-(benzenenesulfonyl)hydrazide and sulfonyl semicarbazides such as p-toluene sulfonyl semicarbazide and p,p'-oxy-bis-(benzenesulfonyl semicarbazide). In this embodiment the rubber of a specially compounded rubber expanded as the blowing agent was heat activated during the vulcanization process to form an integral closed cell structure having a density of about 45 pounds per cubic foot (720.76 kg/m$^3$) and a compressibility of about 28 psi (1.97 kg/cm$^2$) at a fifty percent compression.

The reinforcing cords 56 and 60 of the belt members 54 and 58 and the reinforcing cords 62 extending around the safety support body 46 in a generally radial direction may be of typical tire reinforcing cord material such as nylon, polyester or aramid.

The safety support system 10 is assembled by placing the safety support 44 in the tire 12 and then mounting the tire on the cylindrical rim member 38 so that the groove 64 is in communication with the valve 42 mounted on the rim 36. The split ring rim member 40 is then mounted on the edge of the cylindrical rim member 38 to hold the bead portions 20 and 22 against the safety support 44. To provide the desired pressure against the bead portions 20 and 22, the safety support 44 may be vulcanized so that the width of the safety support between the bead portions is greater than the spacing in the assembled condition. The difference may be about one-half inch or an amount sufficient to provide the desired force after assembly.

Figure 2:
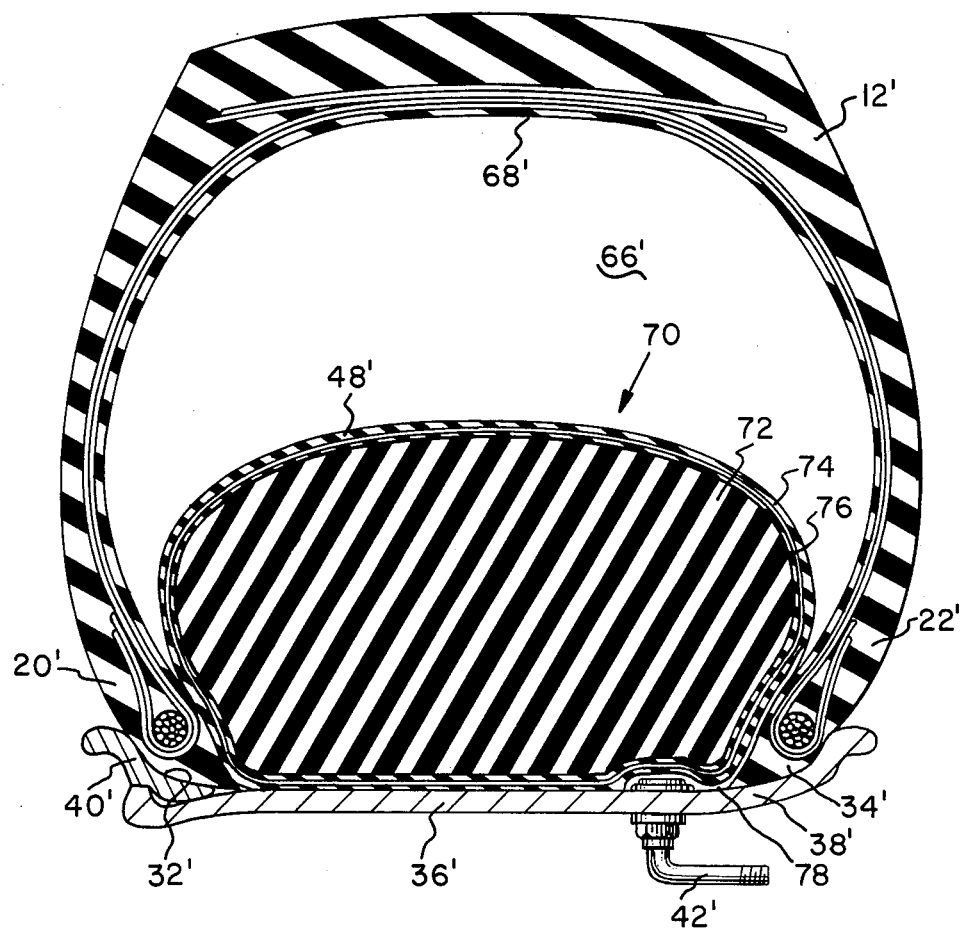
FIG. 2 is a sectional view like FIG. 1 showing a modified safety support system which has a safety support body of a generally solid resilient material mounted in a compressed condition on a two-piece cylindrical rim.

Referring to FIG. 2, a further modification of the safety support system of this invention is shown in which a safety support 70 has a safety support body 72 of resilient material which may be a generally solid low-strength material such as urethane. The safety support body 72 is contained in a casing 74 which includes reinforcing cords 76 wrapped around the safety support body in a generally radial direction. The cords 76 may be of nylon, rayon, aramid or other suitable tire cord material depending upon the strength requirements. In describing the system of FIG. 2, the same numerals with the addition of a prime mark will be used where the parts are identical with the parts of the embodiment shown in FIG. 1. A groove 78 may be provided in the surface of the casing 74 adjacent the valve 42' in the rim member 38' for communicating air to the tire inflation cavity 66' between the outer surface of the safety support 70 and the inner surface 68' of the tire 12'.

The safety support 70 is preferably formed separately from the tire 12' and rim 36'. The safety support body 72 may be made by filling a mold of the desired shape (not shown) with a suitable resilient material such as urethane in liquid form or by injection molding. The reinforcing cords 76 may then be wrapped around the molded body 72 and the vulcanizable rubber of the casing 74 applied around the cords. The complete safety support assembly may then be placed in a mold and completely vulcanized. Preferably the safety support 70 has a molded width greater than the distance between the bead portions 20' and 22' of the tire 12' so that upon mounting of the tire with the safety support body 72 between the bead portions, the material of the safety support body will be compressed as the bead portions are brought together on the rim 36' between the rim members 38' and 40' containing the bead seats 32' and 34'. The generally solid resilient material of the safety support body 72 has a substantially definite volume and this along with the constraint of the casing 74 reinforced by the reinforcing cords 76 acts to compress the rubber of the bead portions 20' and 22' to maintain the resilient material of the safety support body under pressure between the bead portions. Accordingly the reinforcing cords 76 control expansion and maintain the safety support body 72 in position between the bead portions 20' and 22'. An alternative way in which the safety support port 70 may be made is to form the tubular casing 74 by utilizing tubing apparatus for making inner tubes and then wrapping the casing with reinforcing cords 76. The casing 74 may then be spliced, completely vulcanized and provided with at least one valve for filling the casing. The casing may then be filled with a material in liquid form which will solidify as a generally solid resilient material of the support body 72.

Figure 3:
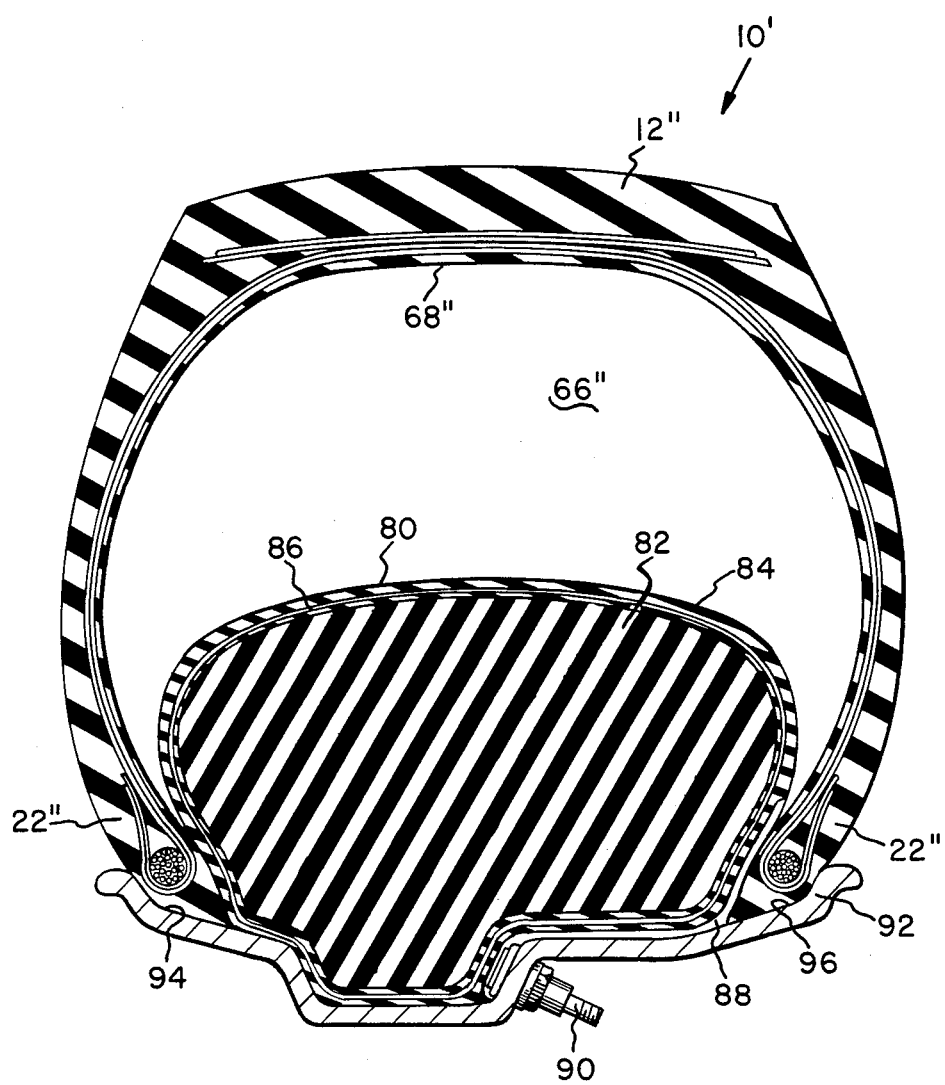
FIG. 3 is a sectional view like FIG. 2 showing a modified safety support system which has a safety support body of a generally solid resilient material pumped into the cavity of a drop center rim under pressure to compress the tire beads and maintain the compression after solidification of the resilient material.

Referring to FIG. 3, a further modification of the safety support system of this invention is shown and in describing this system the same numerals with the addition of a double prime mark will be used where the parts are identical with the parts of the embodiment shown in FIG. 1. Safety support 80 has a safety support body 82 of resilient material which may be a generally solid low-strength material such as urethane. For example, a suitable solid urethane material may have the following properties: Shore A hardness 25, 82% rebound, modulus 0.9 MN/N$^2$, tensile strength 1.8 MN/Cm$^2$, 675% elongation to break, weight 1009.75 kg/m$^3$. The safety support body 82 is contained in a casing 84 which includes reinforcing cords 86 wrapped around the safety support body in a generally radial direction. The cords 86 may be of nylon, rayon, aramid or other suitable tire cord material depending upon the strength requirements. A groove 88 may be provided in the surface of the casing 84 adjacent a valve 90 in a drop center rim 92 for communicating air or other fluid to the tire inflation cavity 66" between the outer surface of the safety support 80 and the inner surface 68" of the tire 12".

Safety support 80 is preferably formed by building the casing 84 separately utilizing tubing apparatus used for making inner tubes and then wrapping the casing with reinforcing cords 86 extending in a generally radial direction. The casing 84 may then be spliced, completely vulcanized and provided with valves (not shown) for filling the casing and venting the casing. The drop center rim 92 may be provided with other valve holes for accommodating the inlet and outlet valves for the casing 84.

The casing 84 may then be placed within the tire 12" which is then mounted on the drop center rim 92 with the bead portions 20" and 22" seated in bead seats 94 and 96 of the drop center rim 92. To fill the safety support casing 84 with a generally solid resilient material of the safety support body 82, the resilient material is pumped into the space within the casing in a liquid form under pressure through the inlet valve of the casing and with the air being vented from the outlet valve of the casing. Upon filling of the casing 84 pressure will be exerted against the bead portions 20" and 22" compressing the resilient material of the bead portions. The resilient material of the safety support 80 is maintained under pressure as it is solidified.

The generally solid resilient material of the safety support body 82 has a substantially definite volume and this along with the constraint of the casing 84 reinforced by the reinforcing cords 86 will maintain compression of the bead portions 20" and 22" which in turn will maintain the compression of the resilient material of the safety support body.

Referring to FIGS. 4 and 5, a still further modification of the safety support system of this invention is shown with a safety support 98 in the molded condition being illustrated in FIG. 4. The safety support 98 has an annular safety support body 100 of resilient material with a cylindrical tire bead separating portion 102. Sidewall supporting flanges 104 and 106 at the edges extend axially and radially outward at an angle 108A and 110B, respectively, relative to a center plane A—A of the safety support 98. The safety support body 100 is preferably of resilient foam material containing closed cells of gas under pressure. The safety support body 100 is confined by a casing 112 of resilient rubber or other rubber-like material having an outer wall 114 and an inner wall 116. The inner wall 116 includes at least one reinforcing belt member 118 having circumferentially extending cords for maintaining the diameter of the inner wall. The casing 112 includes a ply of reinforcing cords 120 with overlapping edges 121 wrapped around the safety support body 100 in a generally radial direction. A groove 122 may be provided in a hard rubber portion of the casing 112 to convey an inflating medium to a tire inflation cavity. The reinforcing cords of the reinforcing belt member 118 and the reinforcing cords 120 of the casing 112 may be of typical tire reinforcing cord material such as nylon, polyester, or aramid.

The safety support body 100 may be of different resilient materials but is preferably of a resilient foam material containing closed cells of gas under pressure. This may be the same material described hereinabove for the safety support body 46 of FIG. 1 and the safety support 98 may be molded in the same manner as set forth above for the safety support 44 of FIG. 1.

A safety support system 124 incorporating the safety support 98 shown in FIG. 4 is illustrated in FIG. 5. The safety support system 124 includes a tire 126 which may be tubeless and have a tread 128, sidewalls 130 and 132, and bead portions 134 and 136 containing beads 138 and 140 connected by reinforcing fabric plies 142 having a reinforcing belt 144. The bead portions 134 and 136 of the tire 126 are seated on bead seats 146 and 148 of a rim 150 which may be of a cylindrical two-piece construction having bead seat 146 on one edge of a cylindrical rim member 152 and bead seat 148 on a split ring rim member 154. A tire valve 156 is mounted on the rim 150 for inflating the tire 126.

The safety support system 124 shown in FIG. 5 is field mountable and is assembled by placing the safety support 98 in the tire 126 and then mounting the tire on the cylindrical rim member 152 so that the groove 122 is in communication with the valve 156. The split ring rim member 154 is then mounted on the edge of the cylindrical rim member 152 to hold the bead portions 134 and 136 against the safety support 98. To provide the desired pressure against the bead portions 134 and 136, the safety support 98 may be vulcanized so that the width of the safety support between the bead portions is greater than the spacing in the assembled condition. The difference may be about one-half inch or an amount sufficient to provide the desired force after assembly.

As shown in FIG. 5, the inner wall 116 of the safety support 98 has a diameter substantially the same as the outer diameter of the rim 150. Also in the inflated condition of the tire 126, the sidewall supporting porting flange 104 is deflected from a position at an angle 108A of approximately sixty degrees to the centerplane A—A to an angle 108B of approximately thirty degrees so that the flange 104 will be pressed against the sidewall 130 during operation. The position of the reinforcing cords 120 extending around the sidewall supporting flanges 104 and 106 provides a bending modulus resisting bending of the flanges and therefore providing for pressure of the flanges against the sidewalls 130 and 132 during operation in the inflated condition of the tire 126 to further resist circumferential movement of the safety support 98 and provide a more stable balanced assembly.

As shown on the right-hand side of FIG. 5, the tire 126 is in the deflated operating condition with the tread 128 resting on a ground surface 158 and the sidewall supporting flange 106 positioned between folded portions of the tire sidewall 132. The angle 110C of the sidewall supporting flange 106 relative to the centerplane A—A is around ninety degrees and, here again, the resistance to bending of the flange provides additional support to the tire and safety support system 124.

Referring to FIG. 6 a further modification is shown in which the safety support 98 has two relatively short axially spaced-apart reinforcing belts 160 and 162 of circumferentially extending cords positioned in the side support at approximately the same diameter as the beads 138 and 140 of the tire 126. With this construction, the safety support 98 may be deflected for insertion into the tire 126 and at the same time the support is reinforced for resisting radial movement away from the rim 150. The support 98 with the belts 160 and 162 may be constructed in a manner similar to the support 44 of FIG. 1 except that the belts are wrapped around a radially inner portion 164 of the foam material and under a radially outer portion 166 of the foam material so that the belts will be embedded in the foam material.

While certain representative embodiments and details have been shown for the purpose of illustrating the invention, it will be apparent to those skilled in this art that various and modifications may be made therein without departing from the spirit or scope of the invention.

What is claimed is:

1. A safety support system comprising a rim, a tubeless tire having a tread, sidewalls and bead portions mounted on bead seats of said rim, a safety support with an annular safety support body which does not have bead rings for positioning within said tire, said safety support body being of a resilient foam material containing cells of gas under pressure confined in a casing of vulcanized rubber, said casing having an outer wall with a predetermined radially outer diameter less than the radially inner diameter of said tire, an inner wall for mounting on said rim having a radially inner diameter substantially the same as the diameter of said rim, at least one reinforcing belt member having circumferential cords of tire reinforcing cord material positioned between said bead portions in said casing, said resilient foam material being under pressure between said bead portions in said casing of vulcanized rubber, said casing including reinforcing cords extending completely around said annular safety support body in a generally radial direction, and said inner wall and said outer wall being connected by casing walls containing only said reinforcing cords to control expansion of said outer wall and maintain said resilient foam material of said safety support body in position between said bead portions.

2. A safety support system in accordance with claim 1 wherein said inner wall includes said reinforcing belt member having circumferential cords.

3. A safety support system in accordance with claim 1 wherein said resilient material of said safety support body expands said body in an axial direction and exerts an axial force against said bead portions of said tire seated in said bead seats of said rim.

4. A safety support system in accordance with claim 1 wherein said resilient foam material is a polyisoprene foam.

5. A safety support system in accordance with claim 1 wherein said outer wall includes at least one reinforcing belt member having circumferential cords.

6. A safety support system in accordance with claim 1 wherein said rim is a cylindrical two-piece rim having one of said bead seats on one edge of a first member and a second one of said bead seats on a second member of said rim and said safety support body having a molded width greater than the distance between said bead portions of said tire so that the mounting of said tire with said safety support body between said bead portions increases the pressure of said safety support body between said bead portions.

7. A safety support system in accordance with claim 1 wherein said safety support body is molded with sidewall supporting flanges in said casing of vulcanized rubber at the edges for positioning between folded portions of the tire sidewalls during operation of the tire in the deflated condition and said reinforcing cords extending around said sidewall supporting flanges for stiffening and providing a resistance to bending of said flanges during operation of said tire in the inflated and deflated conditions.

8. A safety support system in accordance with claim 7 wherein said inner wall includes said reinforcing belt member having circumferentially extending cords.

9. A safety support system in accordance with claim 7 wherein said annular support body includes at least two axially spaced-apart reinforcing belt members having circumferentially extending cords embedded in said foam material.

10. A safety support system in accordance with claim 7 wherein each of said safety support flanges is molded to extend outwardly from said safety support body at an angle to the axis of said assembly which is less than the angle of said sidewalls relative to said axis in the inflated condition of said tire to provide for deflection of said safety support flanges axially inward to press said flanges against said sidewalls during operation in the inflated condition.

11. A safety support system in accordance with claim 7 wherein each of said safety support flanges is molded to extend outwardly from said safety support body at an angle to the axis of said assembly which is greater than the angle of said sidewalls relative to said axis in the deflated condition of said tire to provide for deflection of said safety support flanges axially outward to press said flanges against said sidewalls during operation in the deflated condition.

* * * * *